United States Patent
Sacerdote et al.

(10) Patent No.: US 11,544,318 B2
(45) Date of Patent: Jan. 3, 2023

(54) SYSTEMS AND METHODS FOR PROVIDING IMAGE PORTIONS FOR PROGRESSIVE IMAGES

(71) Applicant: META PLATFORMS, INC., Menlo Park, CA (US)

(72) Inventors: David Andrew Sacerdote, Palo Alto, CA (US); Georges Edouard Maurice Berenger, Menlo Park, CA (US); Federico Daniel Larumbe, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 1446 days.

(21) Appl. No.: 14/863,266

(22) Filed: Sep. 23, 2015

(65) Prior Publication Data
US 2017/0083516 A1    Mar. 23, 2017

(51) Int. Cl.
*G06F 16/51*    (2019.01)
*G06T 3/40*     (2006.01)
*H04N 21/4788*  (2011.01)
*H04N 21/2743*  (2011.01)

(52) U.S. Cl.
CPC ............ *G06F 16/51* (2019.01); *G06T 3/4092* (2013.01); *H04N 21/2743* (2013.01); *H04N 21/4788* (2013.01)

(58) Field of Classification Search
CPC ... G06F 17/3028; G06F 16/51; G06T 3/4092; H04N 21/00
See application file for complete search history.

(56) References Cited

U.S. PATENT DOCUMENTS

| | | | | |
|---|---|---|---|---|
| 9,225,583 | B1 * | 12/2015 | Kolam | G06F 16/9577 |
| 9,560,160 | B1 * | 1/2017 | Kolam | G06F 16/9574 |
| 2011/0016409 | A1 * | 1/2011 | Grosz | G06F 17/3028 715/753 |
| 2015/0113157 | A1 * | 4/2015 | Chan | H04L 65/60 709/231 |
| 2015/0142884 | A1 * | 5/2015 | Veramendi | G06F 17/3028 709/204 |

* cited by examiner

*Primary Examiner* — Kannan Shanmugasundaram
(74) *Attorney, Agent, or Firm* — Sheppard Mullin Richter & Hampton LLP

(57) ABSTRACT

Systems, methods, and non-transitory computer-readable media can generate an address associated with an image. The address can be generated to embed a parameter that specifies a quantity of image portions for representing a particular version of the image. A request can be acquired from a client device for an instance of the image. The request can include the address that embeds the parameter. It can be determined whether a predefined version of the image is stored at an edge server. The predefined version can utilize a predefined quantity of image portions to represent the image. The particular version of the image can be generated, in response to the request for the instance of the image and when the predefined version is stored at the edge server, based on at least a portion of the predefined version and based on the quantity of image portions specified by the parameter.

20 Claims, 10 Drawing Sheets

SYSTEMS AND METHODS FOR PROVIDING IMAGE PORTIONS FOR PROGRESSIVE IMAGES

FIELD OF THE INVENTION

The present technology relates to the field of media processing. More particularly, the present technology relates to techniques for providing image portions for progressive images.

BACKGROUND

Today, people often utilize computing devices (or systems) for a wide variety of purposes. Users can use their computing devices to, for example, interact with one another, access content, share content, and create content. In some cases, users can utilize their computing devices to download, view, or otherwise access media content. For instance, users of a social networking system (or service) can, via their computing devices, access their feeds or other users' profiles to view various posts that include media content items, such as images.

Under conventional approaches rooted in computer technology, transmitting an entire image at its full resolution can, in some cases, require a significant amount of data. In many instances, users' computing devices (or systems) may have limited data access, such as due to limited cellular data plans. Moreover, in some instances, users' computing devices may not necessarily have the capabilities (e.g., due to limited display screen sizes or resolutions) to efficiently utilize entire images at full resolutions. Furthermore, conventional approaches to providing images can store multiple versions of an image to serve different computing devices, which can cause data storage inefficiency. As such, conventional approaches can create challenges for or reduce the overall experience associated with utilizing media content such as images.

SUMMARY

Various embodiments of the present disclosure can include systems, methods, and non-transitory computer readable media configured to generate an address associated with an image. The address can be generated to embed a parameter that specifies a quantity of image portions for representing a particular version of the image. A request can be acquired from a client device for an instance of the image. The request can include the address that embeds the parameter. It can be determined whether a predefined version of the image is stored at an edge server. The predefined version of the image can utilize a predefined quantity of image portions to represent the image. The particular version of the image can be generated, in response to the request for the instance of the image and when the predefined version of the image is stored at the edge server, based on at least a portion of the predefined version of the image and based on the quantity of image portions specified by the parameter.

In an embodiment, a second request can be acquired from a second client device for a second instance of the image. The second request can include a second address that embeds a second parameter. It can be determined that the predefined version of the image is stored at the edge server. A certain version of the image can be generated, in response to the second request for the second instance of the image and when the predefined version of the image is stored at the edge server, based on at least a second portion of the predefined version of the image and based on a second quantity of image portions specified by the second parameter. At least the second portion of the predefined version can be at least partially different from at least the portion of the predefined version. The second quantity of image portions specified by the second parameter can be different from the quantity of image portions specified by the parameter.

In an embodiment, it can be determined that the predefined version of the image is yet to be stored at the edge server. The predefined version of the image can be acquired from an origin server subsequent to determining that the predefined version of the image is yet to be stored at the edge server. The predefined version of the image can be stored at the edge server subsequent to acquiring the predefined version of the image from the origin server.

In an embodiment, the edge server can include logic to process the parameter embedded in the address. The logic to process the parameter embedded in the address can be absent from the client device.

In an embodiment, the particular version of the image can be generated to include the quantity of image portions specified by the parameter. The quantity of image portions specified by the parameter can be less than or equal to the predefined quantity of image portions.

In an embodiment, generating the particular version of the image can further comprise attaching a terminator subsequent to the quantity of image portions specified by the parameter. The particular version of the image can include a header corresponding to that of the predefined version of the image, the quantity of image portions specified by the parameter, and the terminator.

In an embodiment, the address can correspond to a Uniform Resource Locator (URL). The URL can include an image filename extension. The parameter can be subsequent to the image filename extension.

In an embodiment, the image filename extension can include at least one of ".jpeg" or ".jpg". The parameter can include "?se=X". "X" can correspond to a variable indicating the quantity of image portions.

In an embodiment, the quantity of image portions can include a set of one or more progressive image scans.

In an embodiment, the image can include a Joint Photographic Experts Group (JPEG) image. The set of the one or more progressive image scans can include a set of one or more progressive JPEG scans.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
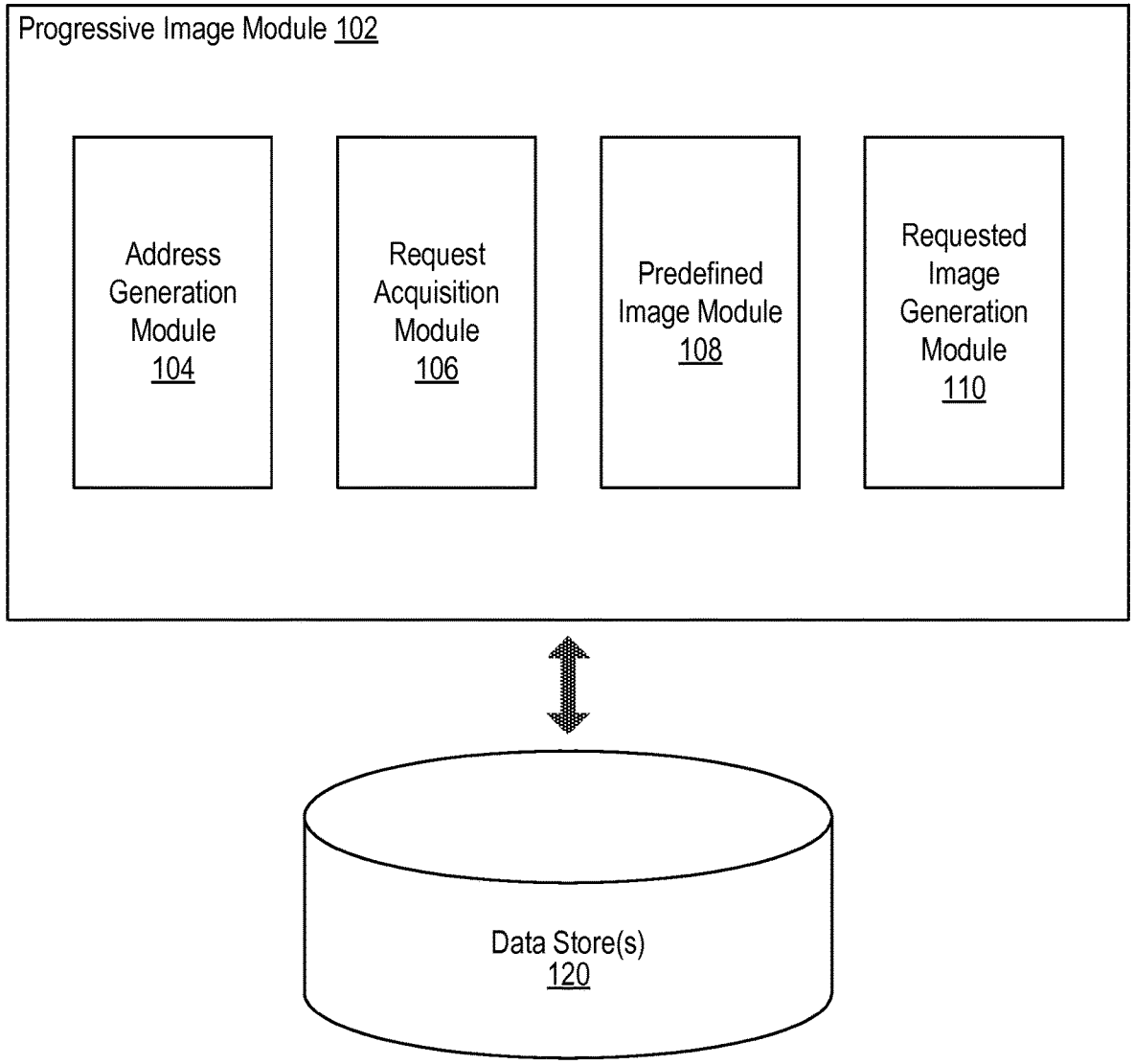
FIG. 1 illustrates an example system including an example progressive image module configured to facilitate providing image portions for progressive images, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Image Portions for Progressive Images

People use computing systems (or devices) for various purposes. Users can utilize their computing systems to establish connections, engage in communications, interact with one another, and/or interact with various types of content. In some cases, a user of a computing device can access media content. For example, the user can utilize his or her computing device to access a social networking system (or service). In this example, the user can download, view, or otherwise interact with a media content item, such as an image, via the user's newsfeed, via pages associated with other entities, and/or via profiles associated with other users of the social networking system.

Conventional approaches rooted in computer technology generally provide, deliver, or transmit an entire image at its full resolution when a user's computing device requests the image. Transmission of the entire image at its full resolution under conventional approaches can require a significant or non-trivial amount of data, which may be limited based on the user's data plan (e.g., cellular data plan). Moreover, in accordance with conventional approaches, network conditions may sometimes not be suitable to allow for efficient transmission of the entire image at its full resolution. Additionally, such conventional approaches to providing images can be inefficient or wasteful when the user's computing device does not require the entire image at its full resolution or when the user's computing device lacks the capability to efficiently utilize the entire image at its full resolution.

Furthermore, in some cases, users who have access to computing devices with adequate image processing capabilities and/or who have access to reliable networks may desire to receive entire images at full resolutions. As such, this can result in conventional approaches having to store multiple versions of each image in a cache. For example, a cache of a content delivery network can store at least a low resolution version of an image and a high resolution version of the image, such that the cache can provide, deliver, transmit, or make available whichever version of the image is suitable based on a request for the image. However, such conventional approaches can cause inefficiencies for data storage, since each image can require multiple versions to be stored or cached.

Due to these or other concerns, conventional approaches can be disadvantageous or problematic. Therefore, an improved approach can be beneficial for addressing or alleviating various drawbacks associated with conventional approaches. Based on computer technology, the disclosed technology can provide image portions for progressive images. Various embodiments of the present disclosure can generate an address associated with an image. The address can be generated to embed a parameter that specifies a quantity of image portions for representing a particular version of the image. A request can be acquired from a client device for an instance of the image. The request can include the address that embeds the parameter. It can be determined whether a predefined version of the image is stored at an edge server. The predefined version of the image can utilize a predefined quantity of image portions to represent the image. The particular version of the image can be generated, in response to the request for the instance of the image and when the predefined version of the image is stored at the edge server, based on at least a portion of the predefined version of the image and based on the quantity of image portions specified by the parameter. It is contemplated that there can be many variations and/or other possibilities associated with the disclosed technology.

FIG. 1 illustrates an example system 100 including an example progressive image module 102 configured to facilitate providing image portions for progressive images, according to an embodiment of the present disclosure. As shown in the example of FIG. 1, the progressive image module 102 can include an address generation module 104, a request acquisition module 106, a predefined image module 108, and a requested image generation module 110. In some instances, the example system 100 can include at least one data store 120. The components (e.g., modules, elements, etc.) shown in this figure and all figures herein are exemplary only, and other implementations may include additional, fewer, integrated, or different components. Some components may not be shown so as not to obscure relevant details.

In some embodiments, the progressive image module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the progressive image module 102 can be implemented, in part or in whole, as software running on one or more computing devices or systems, such as on a user or client computing device. For example, the progressive image module 102 or at least a portion thereof can be implemented as or within an application (e.g., app), a program, an applet, or an operating system, etc., running on a user computing device or a client computing system, such as the user device 710 of FIG. 7. In another example, the progressive image module 102 or at least a portion thereof can be implemented using one or more computing devices or systems that include one or more servers, such as network servers or cloud servers. In some instances, the progressive image module 102 can, in part or in whole, be implemented within or configured to operate in conjunction with a social networking system (or service), such as the social networking system 730 of FIG. 7. It should be understood that there can be many variations or other possibilities.

The address generation module 104 can be configured to facilitate generating an address associated with an image. In some cases, the address generation module 104 can generate the address such that the address embeds a parameter that specifies a quantity of image portions for representing a particular version of the image. The address generation module 104 will be discussed in more detail below with reference to FIG. 2A.

In some implementations, the request acquisition module 106 can be configured to facilitate acquiring (e.g., receiving, fetching, etc.) a request from a client device for an instance (e.g., a version, a copy, etc.) of the image. The request can, in some cases, include the address that embeds the parameter. In one example, a user can attempt to utilize his or her computing device (i.e., the client device), such as a smartphone or tablet, to access a newsfeed, a profile, a page, an album, and/or a communication, etc., at the social networking system. A computing system (e.g., one or more servers) associated with the social networking system can provide one or more stories, posts, or content items published via the newsfeed, the profile, the page, the album, and/or the communication, etc. The one or more stories, posts, or content items can include the image.

Continuing with this example, the computing system associated with the social networking system can utilize the address generation module 104 to generate a set of addresses associated with various versions of the image. Each address in the set of addresses can embed a respective parameter that specifies a respective quantity of image portions for representing a respective version of the image. In this example, a first address can be generated for a lower resolution version of the image, a second address can be generated for a higher resolution version of the image, and so forth. The set of addresses can be provided, transmitted, or delivered to the client device. The client device can then request a particular instance or version of the image. In this example, the client device can request a lower resolution version of the image for rendering a thumbnail or preview of the image at the client device. The request acquisition module 106 can then acquire the request from the client device. It should be understood that all examples herein are provided for illustrative purposes and that there can be many variations or other possibilities.

In some implementations, the request can be made by the client device with respect to an edge server of a content delivery network associated with the computing system (e.g., one or more servers) of the social networking system. Further, in some embodiments, the request can include information about one or more properties of the client device. For instance, the one or more properties can indicate the resolution of a display element of the client device, one or more dimensions (e.g., length, width, diagonal, etc.) of the device (or of the display element of the device), network conditions experienced by the device, and/or other attributes of the device, etc. Many variations are possible.

Moreover, the predefined image module 108 can be configured to facilitate determining whether a predefined version of the image is stored at an edge server. The predefined version of the image can, in some instances, utilize a predefined quantity of image portions to represent the image. More details regarding the predefined image module 108 will be provided below with reference to FIG. 2B.

Additionally, the requested image generation module 110 can be configured to facilitate generating, in response to the request for the instance of the image and when the predefined version of the image is stored at the edge server, the particular version of the image. In some embodiments, the requested image generation module 110 can generate the particular version of the image based on at least a portion of the predefined version of the image and based on the quantity of image portions specified by the parameter. The requested image generation module 110 will be discussed in more detail below with reference to FIG. 2C.

Furthermore, in some embodiments, the progressive image module 102 can be configured to communicate and/or operate with the at least one data store 120, as shown in the example system 100. The at least one data store 120 can be configured to store and maintain various types of data. In some implementations, the at least one data store 120 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 120 can store information associated with users, such as user identifiers, user information, profile information, user locations, user specified settings, content produced or posted by users, and various other types of user data. In some embodiments, the at least one data store 120 can store information that is utilized by the progressive image module 102. Again, it is contemplated that there can be many variations or other possibilities.

Figure 2A:
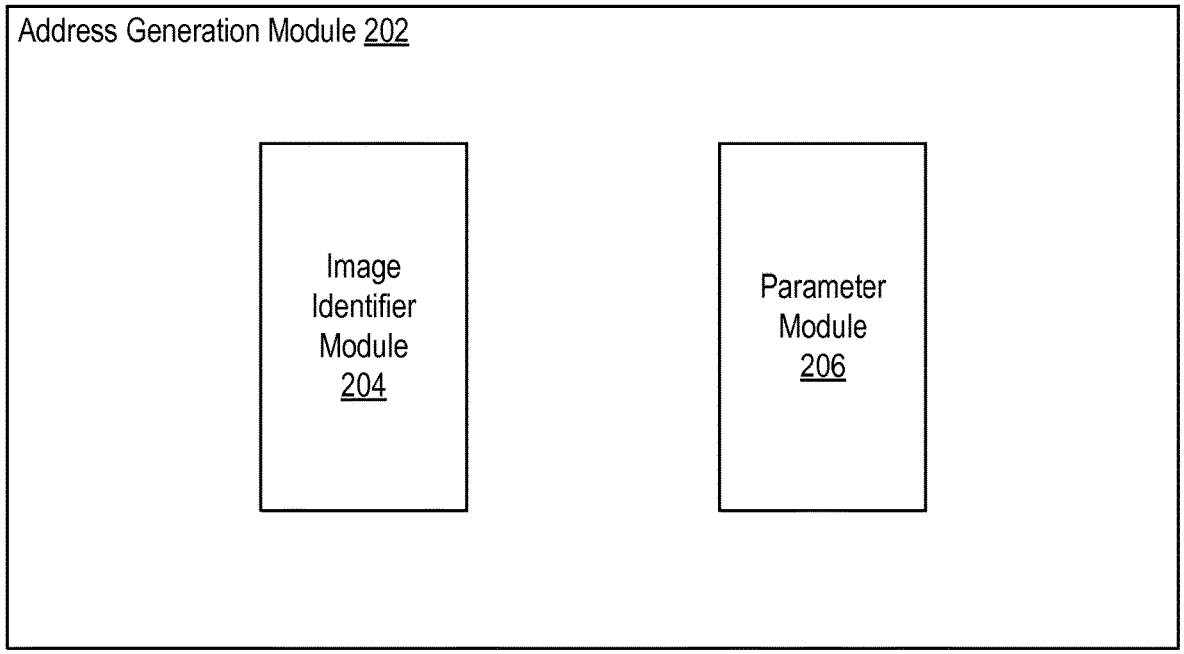
FIG. 2A illustrates an example address generation module configured to facilitate providing image portions for progressive images, according to an embodiment of the present disclosure.

In some implementations, multiple requests for the image can be handled or processed without the edge server having to acquire and store multiple versions of the image. In one example, the request acquisition module 106 can acquire a second request from a second client device for a second instance of the image. The second request can include a second address, generated by the address generation module 104, that embeds a second parameter. The predefined image module 108 can determine that the predefined version of the image is (already) stored at the edge server. The requested image generation module 110 can generate, in response to the second request for the second instance of the image and when the predefined version of the image is stored at the edge server, a certain version of the image. The requested image generation module 110 can generate the certain version of the image based on at least a second portion of the predefined version of the image and based on a second quantity of image portions specified by the second parameter. In this example, at least the second portion of the predefined version can be at least partially different from at least a first portion of the predefined version. The second quantity of image portions specified by the second parameter can be different from a first quantity of image portions specified by a first parameter embedded in a first address within a first request from a first client device. As discussed above, all examples herein are provided for illustrative purposes and many variations are possible.

FIG. 2A illustrates an example address generation module 202 configured to facilitate providing image portions for progressive images, according to an embodiment of the present disclosure. In some embodiments, the address generation module 104 of FIG. 1 can be implemented as the example address generation module 202. As shown in FIG. 2A, the address generation module 202 can include an image identifier module 204 and a parameter module 206.

As discussed previously, the address generation module 202 can be configured to facilitate generating an address associated with an image. The address can be generated by the address generation module 202 to embed a parameter that specifies a quantity of image portions for representing a particular version of the image. In some embodiments, the address can include a first portion and a second portion subsequent to the first portion. The address generation module 202 can utilize the image identifier module 204 to facilitate generating the first portion, which identifies where the particular version of the image can be located at one or more servers (or caches of the servers) associated with a social networking system. In one instance, the image identifier module 204 can generate the first portion to include a web address portion that identifies a web location of the image and that ends in an image filename extension for the image. In some implementations, the address generation module 202 can utilize the parameter module 206 to facilitate generating the second portion, which can correspond to the parameter embedded in the address.

Further, in some cases, the address can correspond to a Uniform Resource Locator (URL). The URL can include an image filename extension. The parameter can be subsequent to the image filename extension. For instance, the image filename extension can include at least one of ".jpeg" or ".jpg" (or ".JPEG", ".JPG", etc.). The parameter can include "?se=X", where "X" can correspond to a variable indicating the quantity of image portions. In one example, the address can be "https://www.example.com/example.jpg?se=3", where the parameter specifies an image portion quantity of three such that this version of the image will include the first three image portions. Many variations are possible.

As discussed previously, the parameter can specify a quantity of image portions for representing a particular version of the image. In some instances, the quantity of image portions can include a set of one or more progressive image scans. The image can include a Joint Photographic Experts Group (JPEG) image. The set of the one or more progressive image scans can include a set of one or more progressive JPEG scans. It is contemplated that many variations associated with the disclosed technology are possible. More details regarding images formed by, represented by, and/or including image portions will be provided below with reference to FIG. 3.

Figure 2B:
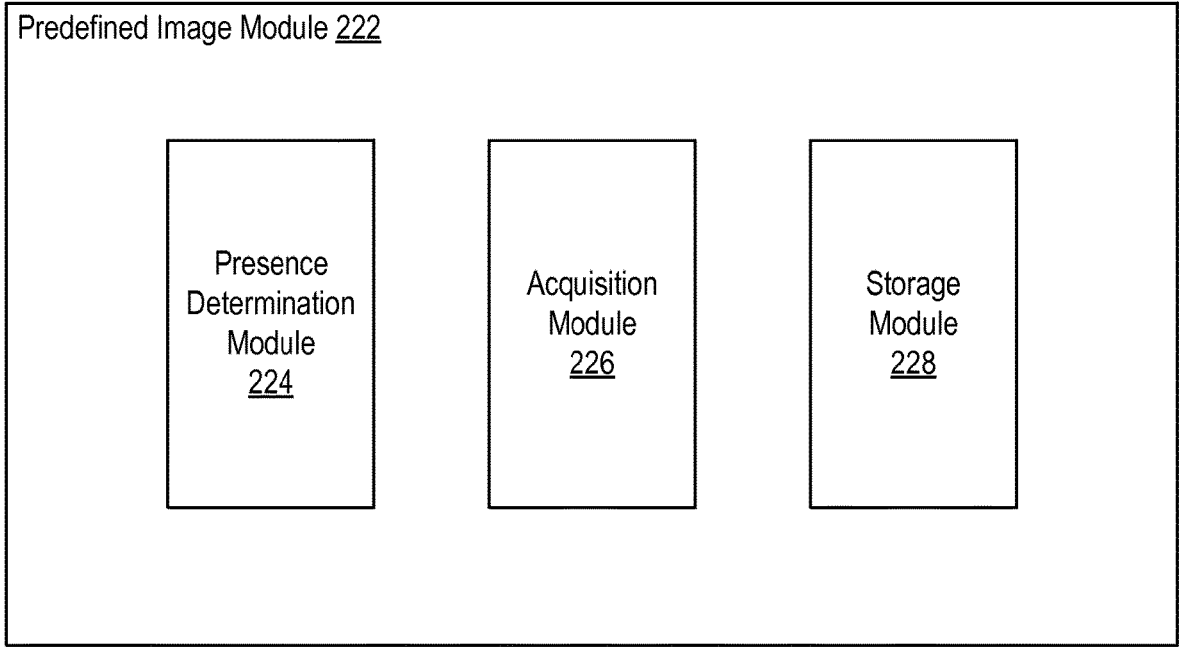
FIG. 2B illustrates an example predefined image module configured to facilitate providing image portions for progressive images, according to an embodiment of the present disclosure.

FIG. 2B illustrates an example predefined image module 222 configured to facilitate providing image portions for progressive images, according to an embodiment of the present disclosure. In some embodiments, the predefined image module 108 of FIG. 1 can be implemented as the example predefined image module 222. As shown in FIG. 2B, the predefined image module 222 can include a presence determination module 224, an acquisition module 226, and a storage module 228.

As discussed above, the predefined image module 222 can be configured to facilitate determining whether a predefined version of the image is stored at an edge server, where the predefined version of the image can utilize a predefined quantity of image portions to represent the image. The predefined image module 222 can utilize the presence determination module 224 to facilitate determining whether the predefined version of the image is stored at the edge server.

Moreover, in some cases, the presence determination module 224 can determine that the predefined version of the image is yet to be stored at the edge server. As such, the predefined image module 222 can utilize the acquisition module 226 to facilitate acquiring the predefined version of the image from an origin server subsequent to determining that the predefined version of the image is yet to be stored at the edge server. The predefined image module 222 can further utilize the storage module 228 to facilitate storing (or caching) the predefined version of the image at the edge server subsequent to acquiring the predefined version of the image from the origin server.

It should be appreciated that there can be many variations or other possibilities associated with the disclosed technology. For instance, in some embodiments, the edge server can include logic to process parameters embedded in addresses. In some cases, the logic to process the parameters embedded in the addresses can be absent from a client device.

Figure 2C:
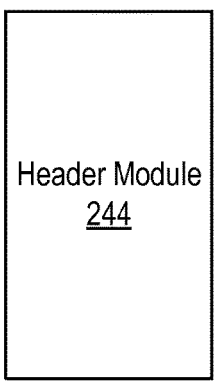
FIG. 2C illustrates an example requested image generation module configured to facilitate providing image portions for progressive images, according to an embodiment of the present disclosure.
Figure 2C:
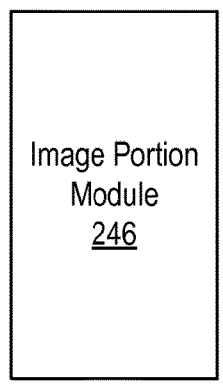
Figure 2C:
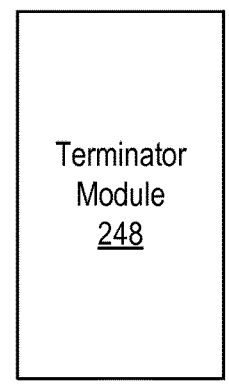

FIG. 2C illustrates an example requested image generation module 242 configured to facilitate providing image portions for progressive images, according to an embodiment of the present disclosure. In some embodiments, the requested image generation module 110 of FIG. 1 can be implemented as the example requested image generation module 242. As shown in FIG. 2C, the requested image generation module 242 can include a header module 244, an image portion module 246, and a terminator module 248.

As discussed above, the requested image generation module 242 can be configured to facilitate generating, in response to a request for an instance of an image and when a predefined version of the image is stored at an edge server, a particular version of the image. The requested image generation module 242 can generate the particular version of the image based on at least a portion of the predefined version of the image and based on a quantity of image portions specified by a parameter embedded in an address within the request. In some embodiments, the requested image generation module 242 can generate the particular version of the image dynamically (e.g., "on the fly") or in/near real-time. The requested image generation module 242 can, in some cases, utilize the header module 244 to facilitate including or incorporating, into the particular version of the image, a header corresponding to that of the predefined version of the image.

Moreover, in some embodiments, the requested image generation module 242 can utilize the image portion module 246 to facilitate generating the particular version of the image such that the particular version of the image includes the quantity of image portions specified by the parameter. In some cases, the quantity of image portions specified by the parameter can be less than or equal to the predefined quantity of image portions. For instance, the predefined version of the image can correspond to a default version or a high resolution version of the image. In some cases, the predefined version can correspond to a highest quality image that is available. As such, when the requested particular version is a lower quality version as specified by the parameter, then the image portion module 246 can include, into the particular version, less image portions than the predefined quantity. In one example, the predefined version of the image has seven image portions (e.g., progressive scans), such as Scan #1 through Scan #7. In this example, if the parameter of the requested particular version specifies an image portion quantity of four, then the image portion module 246 can attach Scan #1 through Scan #4 subsequent to the header for the particular version of the image.

Furthermore, the terminator module 248 can, for example, be configured to attach a terminator subsequent to the quantity of image portions specified by the parameter. Accordingly, in some cases, the particular version of the image can include the header corresponding to that of the predefined version of the image, the quantity of image portions specified by the parameter, and the terminator. Images formed by, represented by, and/or including image portions will be discussed in more detail below with reference to FIG. 3. Again, it is contemplated that all examples herein are provided for illustrative purposes and that many variations are possible.

Figure 3:
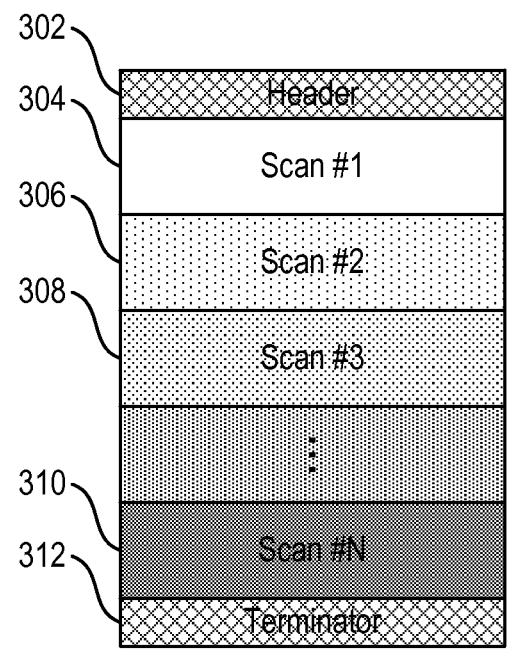
FIG. 3 illustrates an example diagram representing a progressive image associated with providing image portions for progressive images, according to an embodiment of the present disclosure.

FIG. 3 illustrates an example diagram 300 representing a progressive image associated with providing image portions for progressive images, according to an embodiment of the present disclosure. In the example diagram 300 of FIG. 3, there can be a representation of an image which is formed by a header 302, a quantity or set of image portions (e.g., Scan #1 304, Scan #2 306, Scan #3 308, through Scan #N 310, etc.), and a terminator 312. In some embodiments, the header 302 can be configured to indicate the beginning of a data stream representing the image as well as to provide other information about the image. In some implementations, the terminator 312 can indicate the end of the data stream representing the image and can provide other details about the image.

In the example of FIG. 3, the set (or quantity) of image portions can include a set of one or more progressive image scans. For instance, the image can include a Joint Photographic Experts Group (JPEG) image and the set of the one or more progressive image scans can include a set of one or more progressive JPEG scans. In one example, if a predefined version of the image is at a specified or predefined resolution of 1080 p by 1080 p, then the entire set of image portions can collectively form the image (in full/original detail) at the specified or predefined resolution. In this example, each image portion in the set can correspond to a progressive scan and can also be at the specified or predefined resolution. The first progressive scan (e.g., Scan #1 304) can provide general details of the image. If rendered and displayed, the first progressive scan (e.g., Scan #1 304) can appear as a significantly pixelated or blurry 1080 p by 1080 p version of the image. Each successive progressive scan (i.e., each successive image portion) can provide more detail and appear as a less blurry/pixelated version of the image, while also being at the specified or predefined resolution. Again, many variations are possible.

Figure 4:
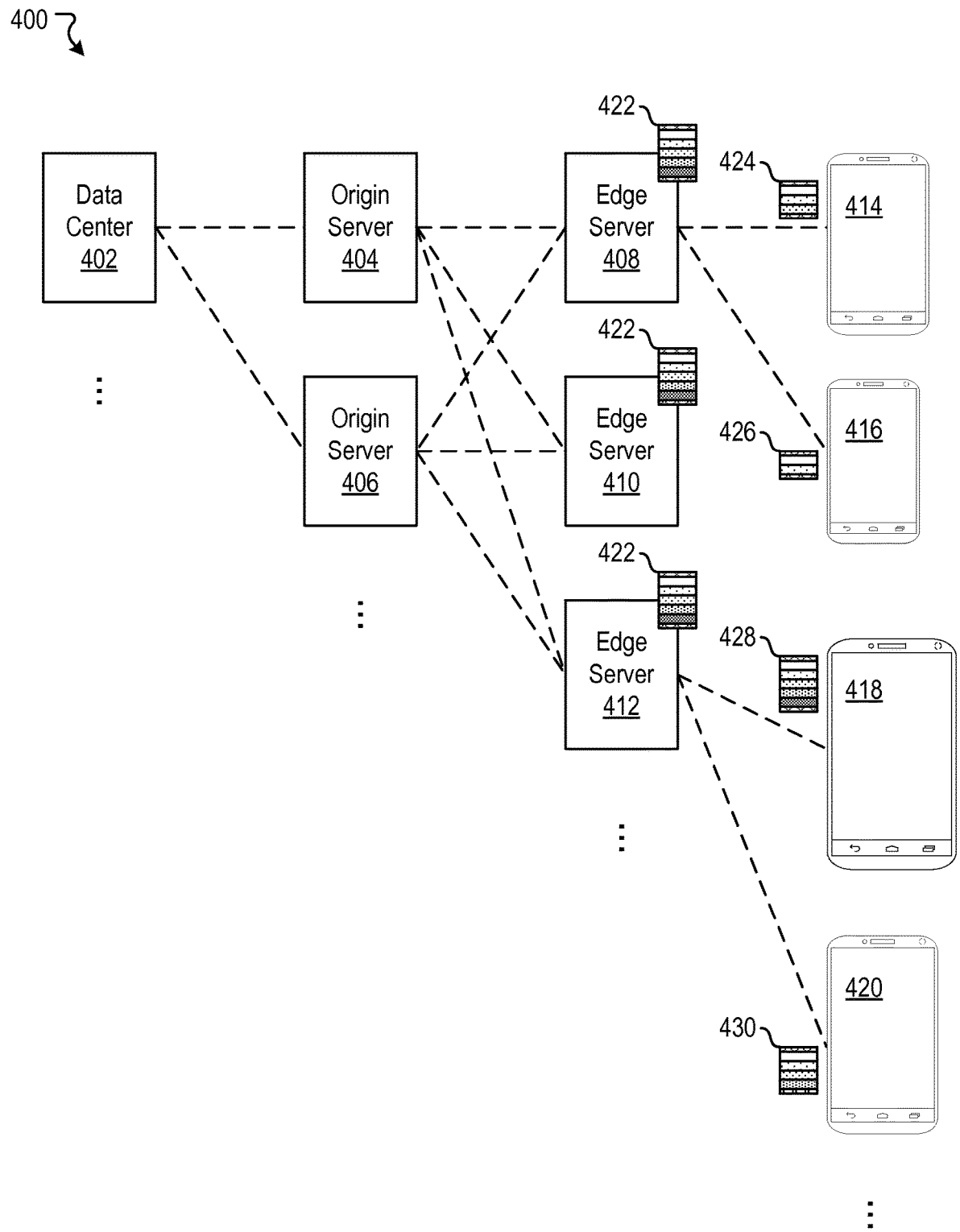
FIG. 4 illustrates an example scenario associated with providing image portions for progressive images, according to an embodiment of the present disclosure.

FIG. 4 illustrates an example scenario 400 associated with providing image portions for progressive images, according to an embodiment of the present disclosure. The example scenario 400 of FIG. 4 shows a computing system including various servers, modules, and/or other components that are configured to facilitate providing image portions for progressive images. In some cases, the computing system can include or correspond to a content delivery network associated with a social networking system.

As shown, the computing system can include at least one data center 402, one or more origin servers (e.g., origin servers 404 and 406), and one or more edge servers (e.g., edge servers 408, 410, and 412). Various components of the computing system can be communicatively connected with one another. Moreover, in the example scenario 400, the edge servers 408, 410, and 412 can be configured to communicate with one or more computing devices (e.g., client devices 414, 416, 418, and 420).

In some embodiments, each edge server can include a respective cache (i.e., edge cache). In this example scenario 400, a first edge server 408, a second edge server 410, and a third edge server 412 can each utilize its respective cache to store a predefined (e.g., original, default, full, high resolution, etc.) version 422 of an image. In one example, the predefined version 422 of the image can be initially absent from each of the edge servers. In this example, a first request from a first client device 414 for an instance of the image can be received or acquired at the first edge server 408. The first edge server 408 can determine whether it has already cached or stored the predefined version 422 of the image. If not, the first edge server 408 can acquire or retrieve the predefined version 422 of the image from at least one of the origin servers. When the first edge server 408 recognizes that it has the predefined version 422 of the image, the first edge server 408 can determine, based on information included in the first request (which provides a parameter and/or properties of the first client device 414), how many image portions to provide or include into a version of the image to be generated and then transmitted to the first client device 414. In this example, the first edge server 408 can determine, based on the first request, that a version 424 of the image including three image portions is suitable for the first client device 414.

Continuing with the example, a second client device 414 can provide to the first edge server 408 a second request for a second instance of the image. The first edge server 408 now has the predefined version 422 of the image and does not need to acquire or retrieve it again from the origin server(s). This can improve data transmission efficiency/optimization or payload efficiency/optimization. Additionally, the first edge server 408 only needs to store a single copy of the image (i.e., the predefined version 422 of the image), which can improve storage or caching efficiency/optimization. In this example, based on the second request, the first edge server 408 can determine that a version 426 of the image with two image portions is suitable for the second client device 416.

Furthermore, as shown in the example scenario 400, a third client device 418 can request an instance of the image from a third edge server 412, which can provide to the third client device 418 a version 428 of the image having all five image portions (e.g., all image portions of the predefined version 422). A fourth client device 420 can also request an instance of the image from the third edge server 412, which can provide a version 430 of the image with four image portions. As discussed previously, all examples herein are provided for illustrative purposes and many variations associated with the disclosed technology are possible.

Figure 5:
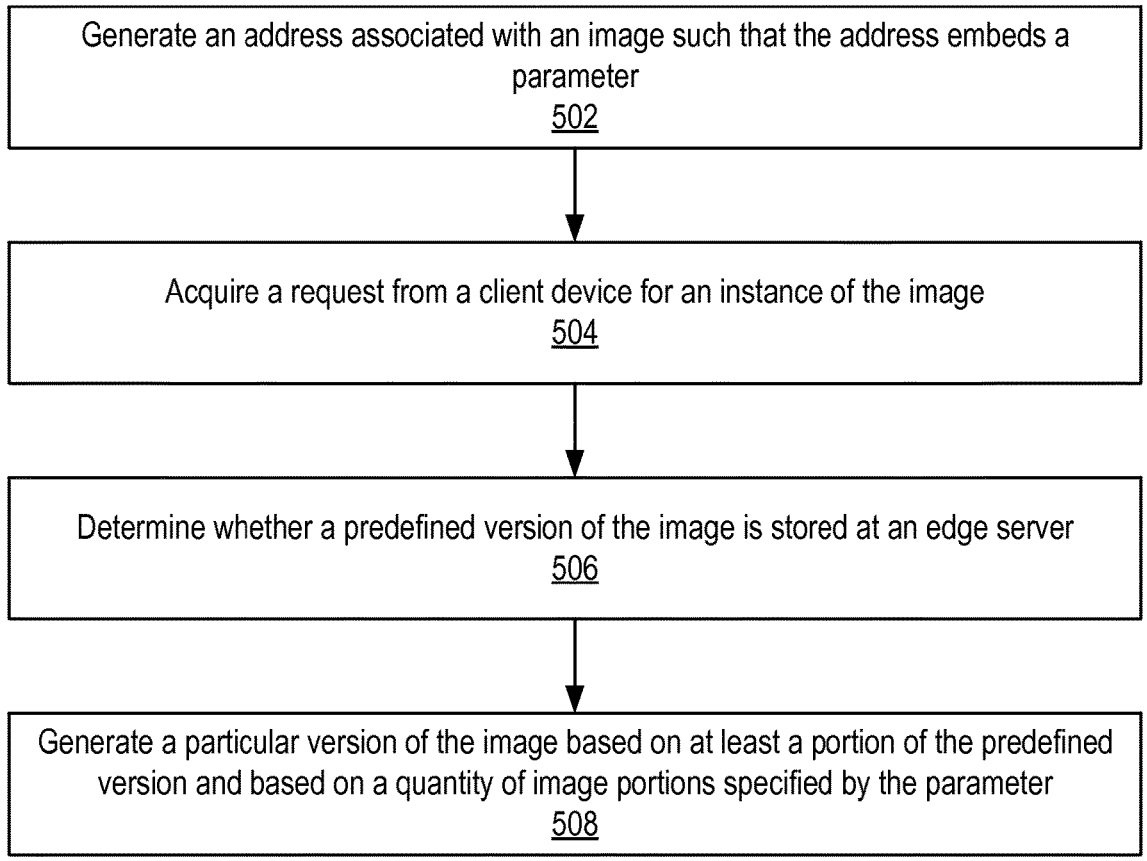
FIG. 5 illustrates an example method associated with providing image portions for progressive images, according to an embodiment of the present disclosure.

FIG. 5 illustrates an example method 500 associated with providing image portions for progressive images, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can generate an address associated with an image. The address can be generated to embed a parameter that specifies a quantity of image portions for representing a particular version of the image. At block 504, the example method 500 can acquire a request from a client device for an instance of the image. The request can include the address that embeds the parameter. At block 506, the example method 500 can determine whether a predefined version of the image is stored at an edge server. The predefined version of the image can utilize a predefined quantity of image portions to represent the image. At block 508, the example method 500 can generate, in response to the request for the instance of the image and when the predefined version of the image is stored at the edge server, the particular version of the image based on at least a portion of the predefined version of the image and based on the quantity of image portions specified by the parameter.

Figure 6:
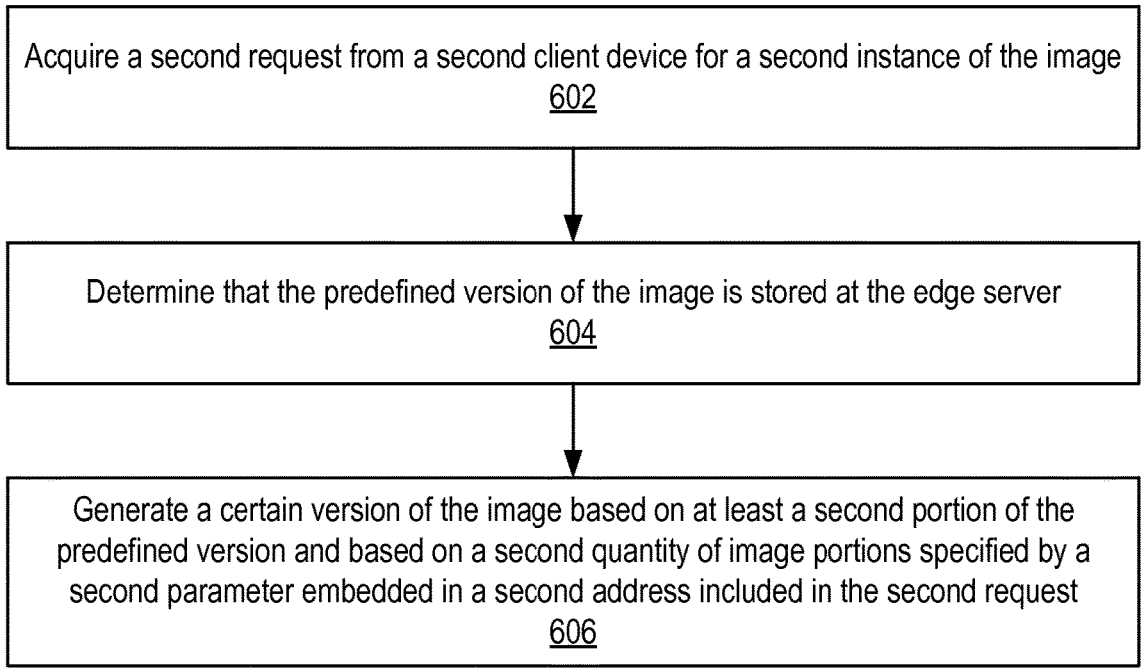
FIG. 6 illustrates an example method associated with providing image portions for progressive images, according to an embodiment of the present disclosure.

FIG. 6 illustrates an example method 600 associated with providing image portions for progressive images, according to an embodiment of the present disclosure. As discussed, it should be understood that there can be additional, fewer, or alternative steps performed in similar or alternative orders, or in parallel, within the scope of the various embodiments unless otherwise stated.

At block 602, the example method 600 can acquire a second request from a second client device for a second instance of the image. The second request can include a second address that embeds a second parameter. At block 604, the example method 600 can determine that the predefined version of the image is stored at the edge server. At block 606, the example method 600 can generate, in response to the second request for the second instance of the image and when the predefined version of the image is stored at the edge server, a certain version of the image based on at least a second portion of the predefined version of the image and based on a second quantity of image portions specified by the second parameter. At least the second portion of the predefined version can be at least partially different from at least the portion of the predefined version. The second quantity of image portions specified by the second parameter can be different from the quantity of image portions specified by the parameter.

It is contemplated that there can be many other uses, applications, features, possibilities, and/or variations associated with the various embodiments of the present disclosure. For example, in some cases, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
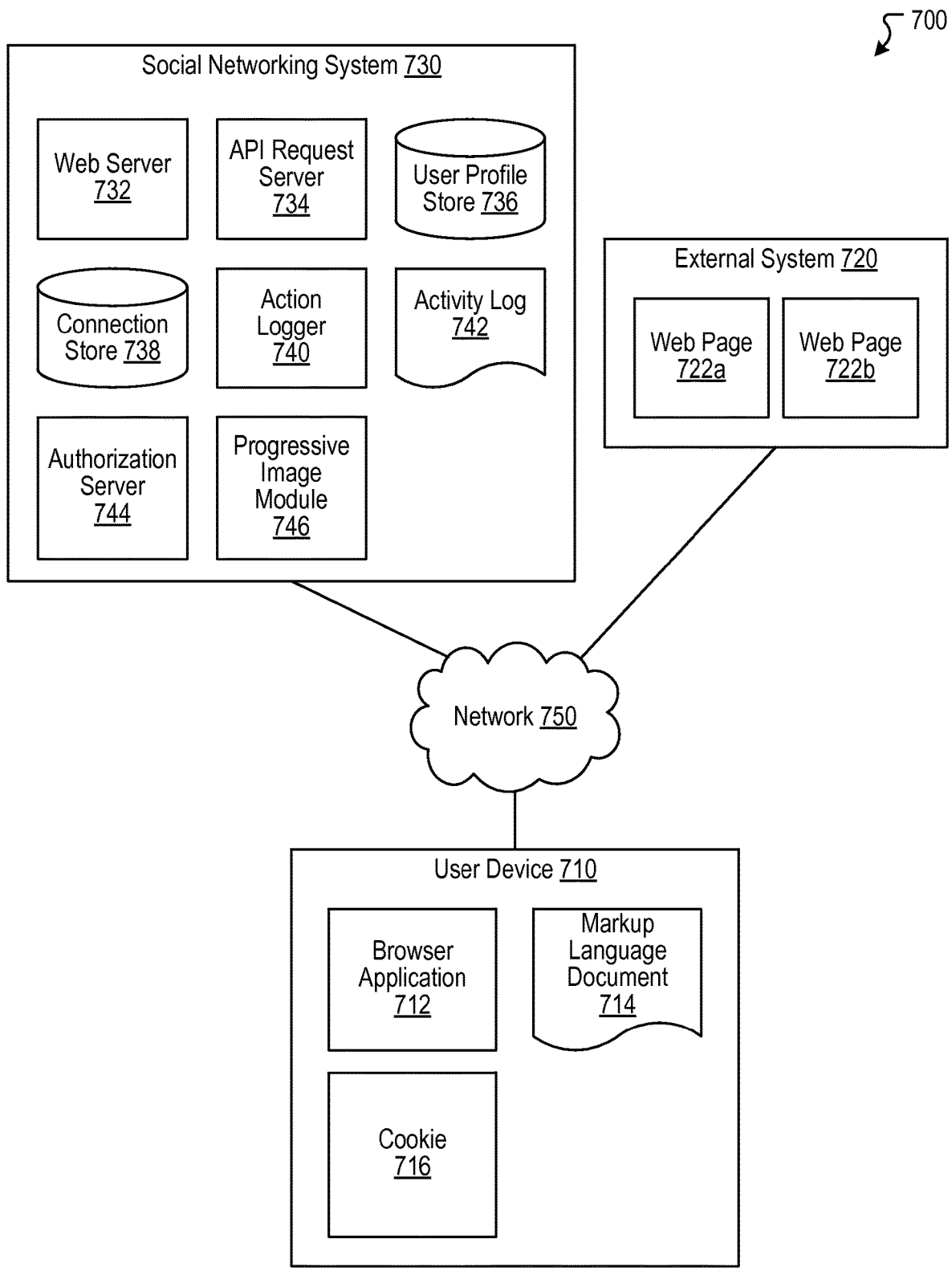
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet. In some embodiments, the social networking system 730 can include or correspond to a social media system (or service).

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a progressive image module 746. The progressive image module 746 can, for example, be implemented as the progressive image module 102 of FIG. 1. As discussed previously, it should be appreciated that there can be many variations or other possibilities. For example, in some instances, the progressive image module (or at least a portion thereof) can be included or implemented in the user device 710. Other features of the progressive image module 746 are discussed herein in connection with the progressive image module 102.

Hardware Implementation

Figure 8:
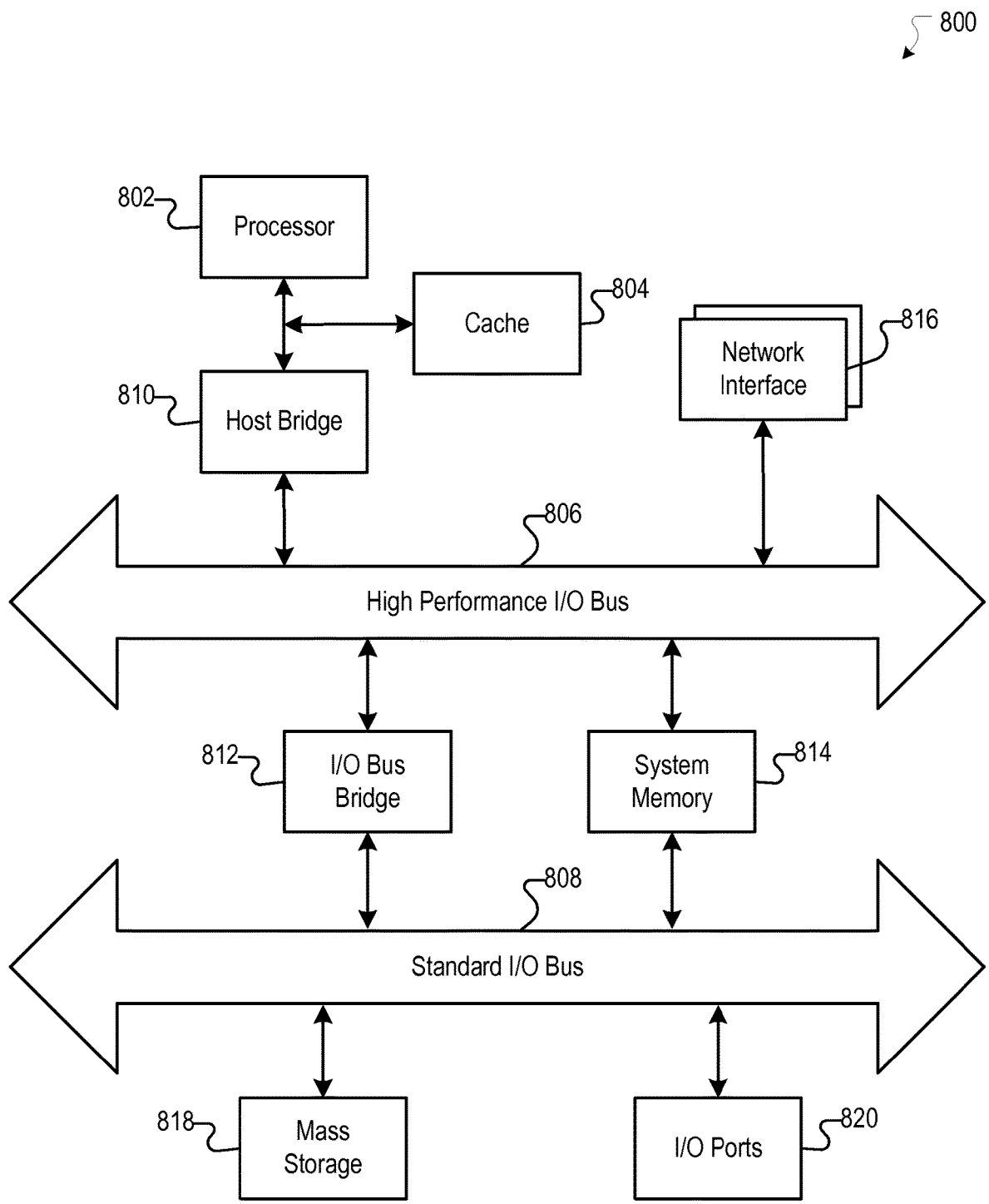
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    generating, by a computing system, an address associated with an image, the address being generated to embed a parameter that indicates a count of image portions for representing a particular version of the image;
    acquiring, by the computing system, a request from a client device for an instance of the image, the request including the address that embeds the parameter;
    determining, by the computing system, whether a predefined version of the image is stored at an edge server, the predefined version of the image utilizing a predefined quantity of image portions to represent the image, wherein the predefined quantity of image portions includes a set of one or more progressive image scans;
    determining, by the computing system, a subset of the set of one or more progressive image scans for the particular version of the image based on the count of image portions indicated by the parameter and based on the predefined quantity of image portions; and
    generating, by the computing system, in response to the request for the instance of the image and when the predefined version of the image is stored at the edge server, the particular version of the image based on at least a portion of the predefined version of the image and based on the subset.

2. The computer-implemented method of claim 1, further comprising:
    acquiring, by the computing system, a second request from a second client device for a second instance of the image, the second request including a second address that embeds a second parameter that specifies a second quantity of image portions for representing a second version of the image, wherein the second quantity of image portions specified by the second parameter is different from the quantity of image portions specified by the parameter;
    determining, by the computing system, a second subset of the set of one or more progressive image scans for the second version of the image based on the second quantity of image portions specified by the second parameter and based on the predefined quantity of image portions; and
    generating, by the computing system, in response to the second request for the second instance of the image, the second version of the image based on at least the predefined version of the image and based on the second subset, wherein the second subset is at least partially different from the subset.

3. The computer-implemented method of claim 1, further comprising:
    determining that the predefined version of the image is yet to be stored at the edge server;
    acquiring the predefined version of the image from an origin server subsequent to determining that the predefined version of the image is yet to be stored at the edge server; and
    storing the predefined version of the image at the edge server subsequent to acquiring the predefined version of the image from the origin server.

4. The computer-implemented method of claim 3, wherein the edge server includes logic to process the parameter embedded in the address, and wherein the logic to process the parameter embedded in the address is absent from the client device.

5. The computer-implemented method of claim 1, wherein the particular version of the image is generated to include the quantity of image portions specified by the parameter, and wherein the quantity of image portions specified by the parameter is less than or equal to the predefined quantity of image portions.

6. The computer-implemented method of claim 5, wherein generating the particular version of the image further comprises:
    attaching a terminator subsequent to the quantity of image portions specified by the parameter, wherein the particular version of the image includes a header corresponding to that of the predefined version of the image, the quantity of image portions specified by the parameter, and the terminator.

7. The computer-implemented method of claim 1, wherein the address corresponds to a Uniform Resource Locator (URL), wherein the URL includes an image filename extension, and wherein the parameter is subsequent to the image filename extension.

8. The computer-implemented method of claim 7, wherein the image filename extension includes at least one of ".jpeg" or ".jpg", wherein the parameter includes "?se=X", and wherein "X" corresponds to a variable indicating the quantity of image portions.

9. The computer-implemented method of claim 1, wherein the quantity of image portions includes a set of one or more progressive image scans.

10. The computer-implemented method of claim 9, wherein the image includes a Joint Photographic Experts Group (JPEG) image, and wherein the set of the one or more progressive image scans includes a set of one or more progressive JPEG scans.

11. A system comprising:
at least one processor; and
a memory storing instructions that, when executed by the at least one processor, cause the system to perform:
generating an address associated with an image, the address being generated to embed a parameter that indicates a count of image portions for representing a particular version of the image;
acquiring a request from a client device for an instance of the image, the request including the address that embeds the parameter;
determining whether a predefined version of the image is stored at an edge server, the predefined version of the image utilizing a predefined quantity of image portions to represent the image, wherein the predefined quantity of image portions includes a set of one or more progressive image scans;
determining a subset of the set of one or more progressive image scans for the particular version of the image based on the count of image portions indicated by the parameter and based on the predefined quantity of image portions; and
generating, in response to the request for the instance of the image and when the predefined version of the image is stored at the edge server, the particular version of the image based on at least a portion of the predefined version of the image and based on the subset.

12. The system of claim 11, wherein the instructions cause the system to further perform:
acquiring a second request from a second client device for a second instance of the image, the second request including a second address that embeds a second parameter that specifies a second quantity of image portions for representing a second version of the image, wherein the second quantity of image portions specified by the second parameter is different from the quantity of image portions specified by the parameter;
determining a second subset of the set of one or more progressive image scans for the second version of the image based on the second quantity of image portions specified by the second parameter and based on the predefined quantity of image portions; and
generating in response to the second request for the second instance of the image, the second version of the image based on at least the predefined version of the image and based on the second subset, wherein the second subset is at least partially different from the subset.

13. The system of claim 11, wherein the instructions cause the system to further perform:

determining that the predefined version of the image is yet to be stored at the edge server;
acquiring the predefined version of the image from an origin server subsequent to determining that the predefined version of the image is yet to be stored at the edge server; and
storing the predefined version of the image at the edge server subsequent to acquiring the predefined version of the image from the origin server.

14. The system of claim 11, wherein the particular version of the image is generated to include the quantity of image portions specified by the parameter, and wherein the quantity of image portions specified by the parameter is less than or equal to the predefined quantity of image portions.

15. The system of claim 14, wherein generating the particular version of the image further comprises:
attaching a terminator subsequent to the quantity of image portions specified by the parameter, wherein the particular version of the image includes a header corresponding to that of the predefined version of the image, the quantity of image portions specified by the parameter, and the terminator.

16. A non-transitory computer-readable storage medium including instructions that, when executed by at least one processor of a computing system, cause the computing system to perform a method comprising:
generating an address associated with an image, the address being generated to embed a parameter that indicates a count of image portions for representing a particular version of the image;
acquiring a request from a client device for an instance of the image, the request including the address that embeds the parameter;
determining whether a predefined version of the image is stored at an edge server, the predefined version of the image utilizing a predefined quantity of image portions to represent the image, wherein the predefined quantity of image portions includes a set of one or more progressive image scans;
determining a subset of the set of one or more progressive image scans for the particular version of the image based on the count of image portions indicated by the parameter and based on the predefined quantity of image portions; and
generating, in response to the request for the instance of the image and when the predefined version of the image is stored at the edge server, the particular version of the image based on at least a portion of the predefined version of the image and based on the subset.

17. The non-transitory computer-readable storage medium of claim 16, wherein the instructions cause the computing system to further perform:
acquiring a second request from a second client device for a second instance of the image, the second request including a second address that embeds a second parameter that specifies a second quantity of image portions for representing a second version of the image, wherein the second quantity of image portions specified by the second parameter is different from the quantity of image portions specified by the parameter;
determining a second subset of the set of one or more progressive image scans for the second version of the image based on the second quantity of image portions specified by the second parameter and based on the predefined quantity of image portions; and
generating in response to the second request for the second instance of the image, the second version of the image based on at least the predefined version of the image and based on the second subset, wherein the second subset is at least partially different from the subset.

18. The non-transitory computer-readable storage medium of claim 16, wherein the instructions cause the computing system to further perform:
   determining that the predefined version of the image is yet to be stored at the edge server;
   acquiring the predefined version of the image from an origin server subsequent to determining that the predefined version of the image is yet to be stored at the edge server; and
   storing the predefined version of the image at the edge server subsequent to acquiring the predefined version of the image from the origin server.

19. The non-transitory computer-readable storage medium of claim 16, wherein the particular version of the image is generated to include the quantity of image portions specified by the parameter, and wherein the quantity of image portions specified by the parameter is less than or equal to the predefined quantity of image portions.

20. The non-transitory computer-readable storage medium of claim 19, wherein generating the particular version of the image further comprises:
   attaching a terminator subsequent to the quantity of image portions specified by the parameter, wherein the particular version of the image includes a header corresponding to that of the predefined version of the image, the quantity of image portions specified by the parameter, and the terminator.

* * * * *